United States Patent [19]
Mosher

[11] 3,854,216
[45] Dec. 17, 1974

[54] DISC BRAKE TOOL

[75] Inventor: Charles L. Mosher, Owatonna, Minn.

[73] Assignee: Owatonna Tool Company, Owatonna, Minn.

[22] Filed: May 14, 1973

[21] Appl. No.: 360,301

[52] U.S. Cl. .......................................... 33/181 AT
[51] Int. Cl. .......................................... G01b 3/38
[58] Field of Search ....... 33/180 AT, 164 D, 147 H, 33/169 R, 181 AT, 203, 203.18, 203.19

[56] References Cited
UNITED STATES PATENTS
1,891,185  12/1932  Miller et al. ................... 33/180 AT
3,618,219  11/1971  Kelly .............................. 33/181 AT Primary Examiner—Louis R. Prince
Assistant Examiner—Willis Little
Attorney, Agent, or Firm—Wegner, Stellman, McCord, Wiles & Wood

[57] ABSTRACT

A disc brake tool for checking a disc brake rotor for thickness variations and lateral run-out having a gauge leg of L-shape carrying an indicator gauge and with use of the gauge leg in one position to check rotor thickness variations and with the gauge leg in a second position being mounted by a gauge arm to a spindle rotatably mounting the rotor for checking of lateral run-out.

9 Claims, 6 Drawing Figures

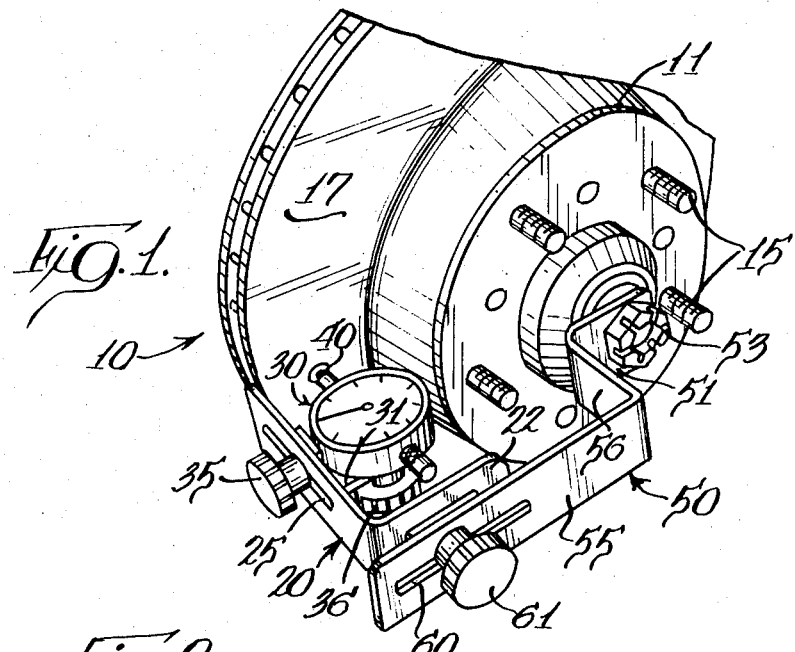
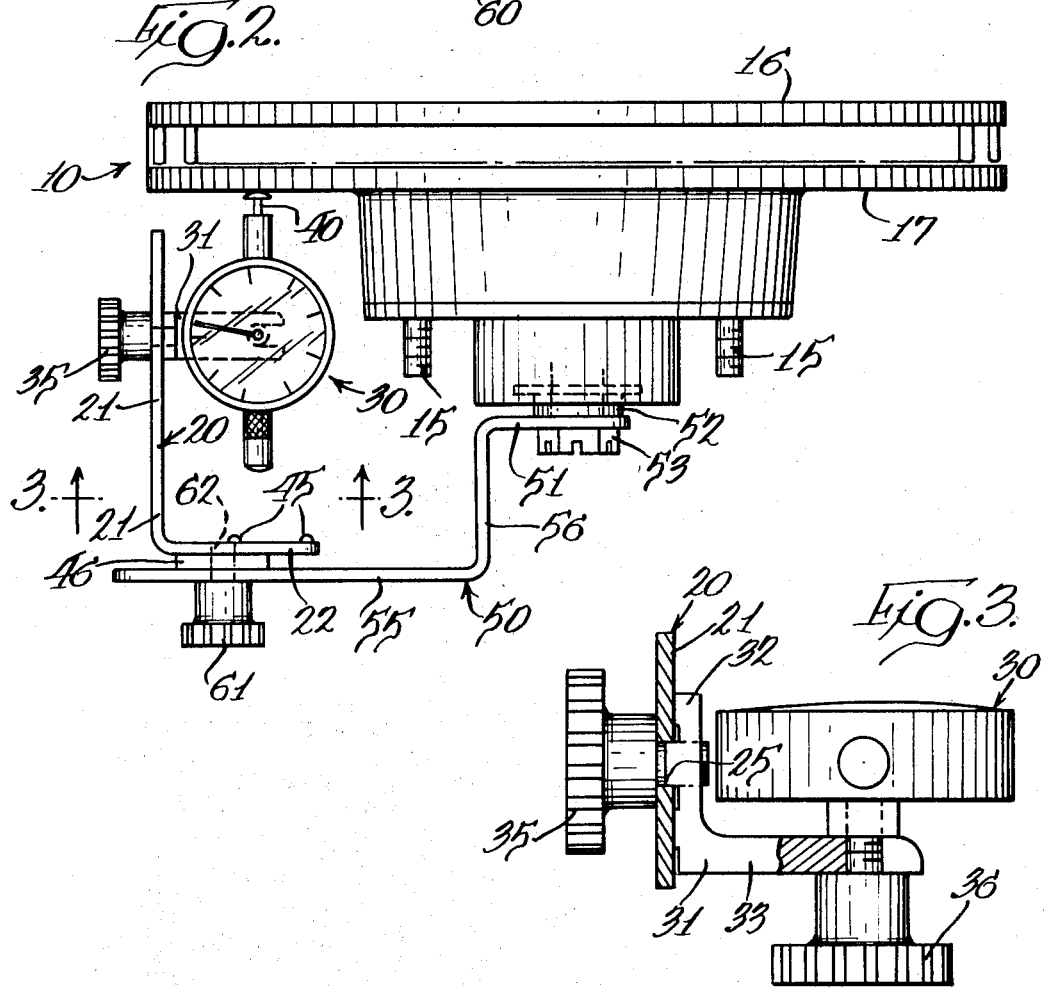

DISC BRAKE TOOL

BACKGROUND OF THE INVENTION

This invention pertains to a disc brake tool for checking a disc brake rotor for thickness variations and lateral run-out.

Servicing of a disc brake includes checking of the disc brake rotor for thickness variations and lateral run-out. Prior art tools for attempting to make such checks of the disc brake rotor are shown in U.S. Pat. Nos. 3,359,642 and 3,618,219, with the latter patent showing a tool attempting to check for both thickness variations and lateral run-out. The tool shown in the latter patent provides for support, at all times, of the indicator gauge, such as a dial indicator, from the spindle supporting the rotor, whereby variations in lateral run-out can result in inaccurate readings of rotor thickness variations.

SUMMARY

A primary feature of the invention embodied herein is in the provision of a disc brake tool having an L-shape gauge leg carrying an indicator gauge which has two different operative positions for determining rotor thickness variations and lateral run-out, respectively, where, in the position for checking thickness variations, the gauge leg is manually held against the rotor and, in the other operative position, is adjustably mounted relative to a spindle supporting the rotor by a gauge arm for checking of lateral run-out, whereby checking of rotor thickness variations may be done completely independently of, and not subject to, possible variations due to lateral run-out and with the tool having a simple, economical construction.

The gauge leg of the disc brake tool has a pair of leg sections normal to each other, with one leg adjustably mounting the indicator gauge for positioning lengthwise of the leg section, and the other leg section having means to facilitate attachment thereof to the gauge arm when checking for lateral run-out of the disc brake rotor and said last mentioned leg section also having three projections extending from a face thereof whereby the leg section may be manually held against a face of the rotor to have said leg section coplanar with the rotor face to resultingly have the stem of the indicator gauge extend generally normal to and in fixed relation to the faces of the disc brake rotor for accurate determination of thickness variations in the rotor at different locations circumferentially about the rotor.

An object of the invention is to provide a new and improved disc brake tool having the features and advantages set forth above.

BRIEF DESCRIPTION OF THE DRAWINGS

FIG. 1 is a perspective view of the disc brake tool shown in association with a disc brake rotor for checking lateral run-out of the rotor;

FIG. 2 is a plan view of the structure shown in FIG. 1;

FIG. 3 is a vertical section, taken generally along line 3—3 in FIG. 2 and with parts broken away;

DESCRIPTION OF THE PREFERRED EMBODIMENT

Figure 4:
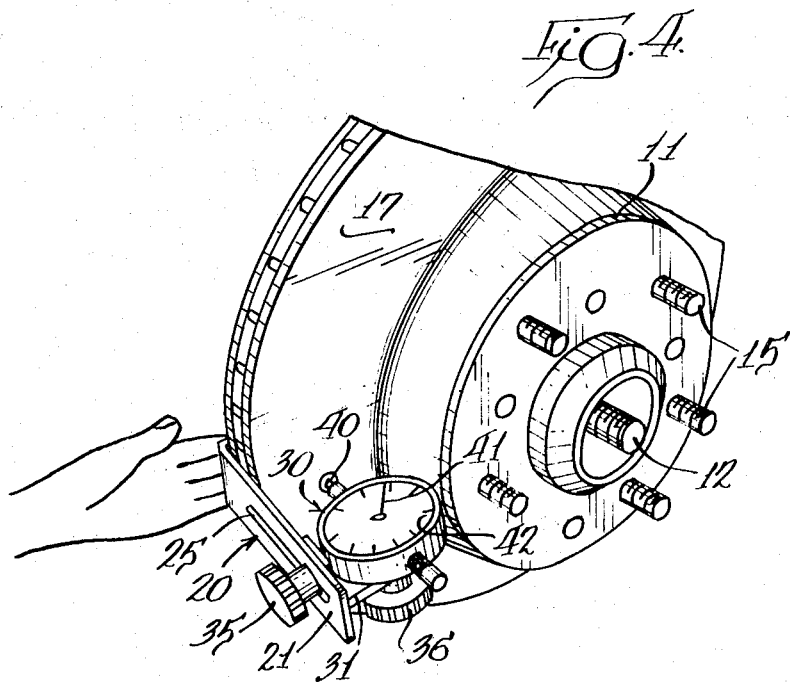
FIG. 4 is a perspective view, similar to FIG. 1, showing the disc brake tool positioned for checking rotor thickness variations.

The disc brake rotor is indicated generally at 10 and has a hub 11 rotatably mounted on a spindle 12 with a plurality of wheel mounting bolts 15 extending therefrom. The rotor 10 has a pair of opposite parallel faces 16 and 17 which extend in parallel relation and which coact with a brake caliper forming part of the disc brake.

In servicing a disc brake, it is standard procedure to check for variations in thickness of the rotor and, specifically, the distance between the faces 16 and 17 and also to check for lateral run-out with respect to the spindle 12.

Figure 5:
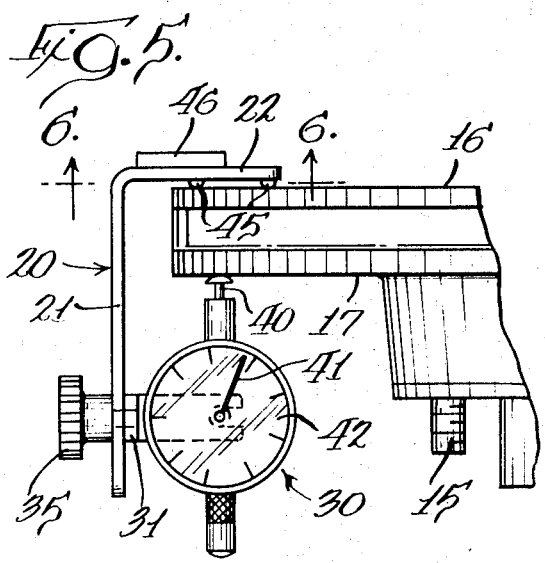
FIG. 5 is a fragmentary plan view of the structure shown in FIG. 4.
Figure 6:
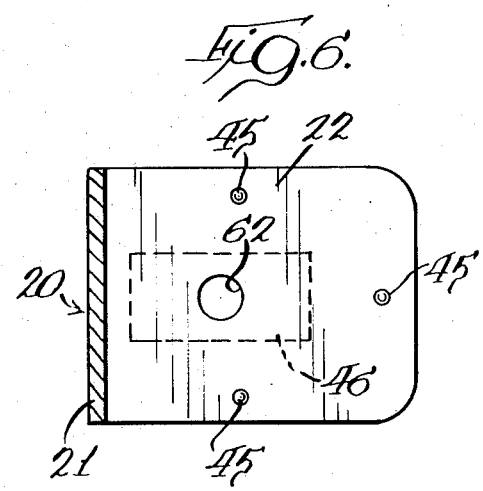
FIG. 6 is a vertical section, taken generally along the line 6—6 in FIG. 5.

The disc brake tool is shown arranged and positioned for use in checking lateral run-out in FIGS. 1–3 of the drawings, while the tool is shown in position for checking rotor thickness variations in FIGS. 4–6.

One part of the tool is a gauge leg 20. The gauge leg has an L-shape, with a pair of leg sections 21 and 22 extending at right angles to each other. The gauge leg is formed of planar material and has an elongate slot 25 in the leg section 21 extending lengthwise thereof.

An indicator gauge, in the form of a dial indicator indicated generally at 30, is mounted to the leg section 21 of the gauge leg for adjustable positioning along the length of the slot 25. This mounting is provided by a gauge angle 31, shown particularly in FIG. 3, which has a leg 32 abutting a face of the leg section 21 and a split leg 33 mounting the dial indicator 30. The leg 32 is fastened to the leg section 21 by a knob screw 35 which threads into an opening in the leg 32 of the gauge angle with extension through the slot 25. The dial indicator 30 is secured to the leg 33 of the gauge angle by a knob screw 36 extending through the leg 33 and threaded into a threaded opening in a base part of the dial indicator.

The dial indicator 30 is a commercially available unit having a follower stem 40 and a needle 41 operated thereby with a rotatable dial face 42.

The leg section 22 of the gauge leg 20 has three projections 45 extending outwardly a uniform distance from one face thereof for use in detecting variations in rotor thickness. This operation is shown in FIGS. 4–6 wherein the gauge angle 31 and gauge 30 are associated with the gauge leg 20, as shown in FIGS. 4 and 5. The leg section 22 of the gauge leg is positioned adjacent the rotor face 16 with the projections 45 engaging rotor face 16. Manual pressure, as shown in FIG. 4, against the leg section 22 places the projections 45 in firm engagement with the rotor face 16 whereby the leg section 22 is in coplanar relation with the rotor face 16.

The use of the three projections 45 establishes a plane which is parallel with the rotor face and assures uniform orientation of the indicator gauge at different circumferentially-spaced sections of the rotor. A block 46 extends for less than the full height of the leg section 22 and facilitates placement of the user's fingers against the leg section to apply firm pressure against the gauge leg 20.

An additional part of the disc brake tool is a gauge arm, indicated generally at 50, and which is mountable on the spindle 12. The gauge arm 50 has a first part 51 provided with an opening to fit onto the spindle 12 and a spacer 52 secured to the part 51. A spindle nut 53 threads onto the spindle 12 to hold the gauge arm 50 in fixed relation with the spindle. A second part 55 of the gauge arm 50 is in parallel relation with the first part 51, but offset in a different plane because of an offset 56 between the parts 51 and 55. This places the second part 55 at a greater distance from the rotor, than the first part 51, to enable positioning of the indicator gauge 30 as shown in FIGS. 1 and 2. The gauge arm 50 functions to support the gauge leg 20 and the indicator gauge 30. This support is accomplished by means of an elongate slot 60 extending lengthwise of the second part 55 of the gauge arm with a knob screw 61 extended through the slot 60 and threaded into a threaded opening 62 in the gauge leg section 22. The knob screw also extends through an opening provided in the block 46. The elongate slot 60 provides for adjustment of the indicator gauge 30 radially of the spindle 11 whereby lateral run-out of disc brake rotors of differing diameters may be checked.

In checking for variations in rotor thickness, the gauge indicator 30 is positioned in relation to the gauge leg 20, as shown in FIG. 4, with the gauge being moved to a position adjacent one end of the elongate slot 25 and the knob screw 35 tightened. The tool is then positioned with the leg section 22 adjacent the rotor face 16 and with the gauge stem 40 extending toward the rotor face 17. With manual pressure applied to the leg section 22 to press the projections 45 into firm engagement with the rotor face 16, the indicator gauge 30 is then advanced to bring the stem 40 into engagement with the rotor face 17 approximately one inch from the rotor periphery and cause movement of the needle 41 to a position midway on the 0 to 5 scale of the gauge. The knob screw 35 is again tightened to hold the indicator gauge 30 in the set position and the indicator needle 41 is then effectively set to zero by rotating the dial face 42. The rotor 10 is then turned clockwise with a check at a number of equally spaced locations for variations in thickness from the initial zero setting on the indicator gauge with accurate readings being obtained by firm pressure being applied against the leg section 22. The variations in rotor thickness are readily and accurately determined since the tool is completely independent of support from the spindle 12 and accurately located by the manual pressure applied to hold the projections 45 against the rotor face 16.

For checking lateral run-out, the gauge arm 50 is mounted to the spindle 12 in the manner previously described and as shown in FIGS. 1 and 2 and the gauge leg 20 is mounted thereto. The radial position of the gauge leg 20 is dependent upon the diameter of the rotor being checked and is set by the location of the knob screw 61 along the elongate slot 60. In effect, the gauge leg 20 is rotated through a half revolution relative to the indicator gauge 30 to bring the leg section 22 from a position adjacent the rotor face 16 to a position adjacent the second part 55 of the gauge arm, with the knob screw 61 holding the parts in secured adjusted position.

In operation and use of the tool, the gauge arm 50 is attached to the spindle with the spindle nut 53 which is torqued to the specifications of the manufacturer of the disc brake and the rotor 10 is then rotated several times to center the bearing which mounts the rotor 10 on the spindle and to make sure the pads on the brake caliper are not causing excessive drag on the rotor. If excessive drag is present, the brake caliper should be removed. The gauge leg 20, with the indicator gauge 30 associated therewith in the manner shown in FIGS. 1 and 2, is then assembled to the gauge arm 50. The knob screw 35 is loosened and the indicator gauge 30 is moved toward the rotor face 17 to bring the stem 40 into engagement with the rotor face and move the gauge needle 41 to a position midway on the 0 to 5 scale and the knob screw 35 is then tightened. Again, the dial face 42 is rotated to set the needle to zero and the rotor is then turned in a clockwise direction with checks for variation from the original zero setting.

I claim:

1. A disc brake tool for checking a disc brake rotor for thickness variations and lateral run-out comprising, a gauge arm mountable to a spindle supporting said rotor, a gauge leg carrying an indicator gauge, means on said gauge leg coacting with said gauge arm to mount the gauge leg and indicator gauge in position to check lateral run-out, and additional plane establishing means on said gauge leg to position the gauge leg and indicator gauge independently of the gauge arm with the gauge leg parallel to a face of the brake rotor for checking the rotor for thickness variations.

2. A disc brake tool as defined in claim 1 wherein said gauge arm has an offset section with an elongate slot extending lengthwise thereof, and means for holding the gauge leg and indicator gauge at varying positions lengthwise of said elongate slot whereby the position of the indicator gauge radially of the disc brake rotor may be varied.

3. A disc brake tool as defined in claim 1 wherein said gauge leg is an L-shape planar member with a pair of leg sections, one of said leg sections carrying said indicator gauge and the other leg section having both said mounting means and said additional means.

4. A disc brake tool as defined in claim 3 wherein said additional plane establishing means includes three projections engageable with a face of the disc brake rotor to place said other leg section in parallel relation with said face.

5. A disc brake tool for checking a disc brake rotor having opposite faces comprising, a gauge leg having an L-shape with leg sections at right angles, means on one leg section to engage one face of the rotor at three triangularly related points to have said one leg section parallel with said one face, an indicator gauge, and means on said other leg section adjustably mounting said indicator gauge for positioning relative to the other rotor face and along a line normal to said one face.

6. A disc brake tool as defined in claim 5 wherein said gauge leg is formed of planar materal, said adjustable mounting means includes an angle bar having a planar leg abutting said other leg section and mounting said indicator gauge, an elongate slot in said other leg section extending lengthwise thereof and a knob screw extended through said slot and threaded into said planar leg whereby the angle bar may be adjustably positioned lengthwise of said other leg section.

7. A disc brake tool as defined in claim 5 wherein said one leg section of the gauge leg has an opening therethrough, a gauge arm mountable to a spindle supporting the disc brake rotor, and means for mounting the gauge leg to the gauge arm with the gauge leg posititioned to place said one leg section on the same side of the disc brake rotor as the indicator gauge.

8. A disc brake tool for checking a disc brake rotor for thickness variations and lateral run-out comprising, a gauge arm mountable to a spindle supporting said rotor and having a pair of parallel parts with an offset therebetween, one of said parts being mounted to said spindle and the other part extending radially of the spindle and at a greater distance from said rotor than said one part, a gauge leg having an L-shape with a pair of leg sections normal to each other, an indicator gauge, means for adjustably mounting said indicator gauge to one of said leg sections with the stem of said gauge normal to a face of said rotor, first means on the other leg section of said gauge leg for removably attaching said gauge leg to said other part of the gauge arm, and second means on said other leg section for engaging a face of said rotor opposite from said first mentioned face to locate said stem normal to said rotor faces independently of and without attachment to said gauge arm.

9. A disc brake tool as defined in claim 8 wherein said second means includes three projections on said other leg section.

* * * * *